US007475157B1

(12) United States Patent
Tormasov (10) Patent No.: US 7,475,157 B1
(45) Date of Patent: Jan. 6, 2009

(54) SERVER LOAD BALANCING SYSTEM

(75) Inventor: Alexander Tormasov, South San Francisco, CA (US)

(73) Assignee: SWsoft Holding, Ltd. (BM)

( * ) Notice: Subject to any disclaimer, the term of this patent is extended or adjusted under 35 U.S.C. 154(b) by 726 days.

(21) Appl. No.: 10/242,810

(22) Filed: Sep. 13, 2002

Related U.S. Application Data

(60) Provisional application No. 60/322,354, filed on Sep. 14, 2001.

(51) Int. Cl.
*G06F 15/173* (2006.01)
*G06F 15/16* (2006.01)
(52) U.S. Cl. .................................... 709/238; 709/227
(58) Field of Classification Search ................ 709/227, 709/228, 238–242; 714/807, 808
See application file for complete search history.

(56) References Cited

U.S. PATENT DOCUMENTS

| | | | | |
|---|---|---|---|---|
| 6,182,139 B1* | 1/2001 | Brendel | | 709/226 |
| 6,266,335 B1* | 7/2001 | Bhaskaran | | 370/399 |
| 6,389,462 B1* | 5/2002 | Cohen et al. | | 709/218 |
| 6,412,092 B1* | 6/2002 | Raghunath | | 714/807 |
| 6,601,101 B1* | 7/2003 | Lee et al. | | 709/227 |
| 6,779,035 B1* | 8/2004 | Gbadegesin | | 709/228 |
| 6,801,949 B1* | 10/2004 | Bruck et al. | | 709/232 |
| 6,820,233 B2* | 11/2004 | Johansson et al. | | 714/808 |
| 6,882,654 B1* | 4/2005 | Nelson | | 370/401 |
| 7,154,912 B2* | 12/2006 | Chong et al. | | 370/486 |
| 7,188,180 B2* | 3/2007 | Larson et al. | | 709/227 |
| 2001/0034752 A1* | 10/2001 | Kremien | | 709/105 |
| 2002/0026502 A1* | 2/2002 | Phillips et al. | | 709/219 |
| 2002/0112087 A1* | 8/2002 | Berg | | 709/313 |
| 2002/0116397 A1* | 8/2002 | Berg | | 707/200 |
| 2002/0161911 A1* | 10/2002 | Pinckney et al. | | 709/231 |
| 2003/0023743 A1* | 1/2003 | Raphel et al. | | 709/232 |
| 2007/0061470 A1* | 3/2007 | Berg | | 709/227 |

OTHER PUBLICATIONS

Webopedia—definition of "kernel" (www.webopedia.com/TERM/k/kernel.html).*
Linux Network Address Translation, Linas Vepstas; Created Aug. 31, 1996, Last Updated Nov. 1998.*

* cited by examiner

*Primary Examiner*—Glenton B Burgess
*Assistant Examiner*—Michael D Meucci
(74) *Attorney, Agent, or Firm*—Bardmesser Law Group (57) ABSTRACT

A system for maximizing the efficiency of a load balancing server for an asymmetric web farm utilizes a TCP stack and data packets to send and receive client service requests. An internal buffer enables each web server in the web farm to balance their loading based on the contents of the client service request. Data switching between the address portion of the user space and the address portion of the kernel space within the load balancing server is eliminated.

24 Claims, 5 Drawing Sheets

SERVER LOAD BALANCING SYSTEM

CROSS-REFERENCE TO RELATED APPLICATION

The present application claims the benefit of U.S. Provisional Application for Patent Ser. No. 60/332,354, filed Sep. 14, 2001.

TECHNICAL FIELD

This invention relates to a system and method for maximizing the efficiency of the load balancing among web servers included in an asymmetric server farm.

DESCRIPTION OF THE PRIOR ART

One of the basic goals in the creation of the Internet was the ability to share computer resources among users. Accordingly, the Internet has enabled the availability of several different types of computer related services to users. The World Wide Web (WWW) is the most commonly used computer related service. Users, or clients, of computer related services enabled by the Internet, are able to request virtually unlimited amounts of information and receive that information in an easily understandable and useable format. File Transfer Protocol or FTP is another frequently used service enabled by the Internet which assures file access. Email service, which enables users to exchange messages quickly and easily via the Internet, is also very popular.

In the client-server model, web servers are the computer resources which process client applications or requests. A load balancing server enables the flow of traffic to the web servers and acts as a delivery service form the web servers back to the clients. Regular servicing of client requests, i.e., the ability to receive a request from a client by a web server and then provide a response back to the client, is generally described in reference (8) in the illustrated Bibliography.

Because web servers are limited by their own computing power, a web server is only able to carry out a limited number of operations in a given unit of time. And, because several operations may be required to properly answer each service request from a client, the web server may be able to process only a finite number of client service requests during any given time period. Thus, it is computing power of the web server that provides a limit on the number of client service requests that can be responded to during any given unit of time. When the computing power of the web server is insufficient to respond to all client service requests, some client service requests are not met. When possible, the problem of not responding to a client service request is remedied by an upgrade in web server computing power to decrease the number of unserved client service requests.

The approach of continuing to upgrade the computing power of the web server has some disadvantages, since there is a limit to the computing power of web servers which are commercially available. Additionally, the incremental cost to upgrade a web server is not proportional to the increased computing power, i.e., doubling the power of a web server more than doubles its cost.

It has been found that the use of more than one web server to respond to client service requests eliminates the problem of reaching the capacity limit of a single web server, while the cost of using more than one web server remains directly proportional to the computing power obtained. The maximum computing power available to process client service requests will then depend on the number of web servers in use and will not be restricted by the laminations of the individual web server computers presently available in the marketplace.

A group of web servers, linked together for responding to client server requests, is called a web farm. Individual web servers within the web farm are called real servers. For more details about web servers, see references (1) and (12) in the Bibliography. According to the way the Internet functions, a request from a client sent to a particular address can only be received by one network web server. When a load balancing server is installed at the web farm receiving client service requests, one or more individual real servers in the web farm can be used to process the requests sent to the web farm. The load balancing server performs the following functions in a web farm:

receives client service requests;
selects one or more real servers to process the client service request;
forwards the client service request to the real server;
receives the real server response to the client service request; and
forwards the real server response back to the client that initiated the client service request.

Thus, all of the client service requests to the web farm must first go through the load balancing server. The passage of each client service request through the load balancing server requires some amount of processing time. Therefore, both the web farm and the power of the load balancer limit the ability of the web farm to respond to client request. Thus, the efficiency of the load balancing server is extremely important.

High-level protocols such as HTTP, FTP, and POP3, which establish the rules and parameters that define and enable communication through a network, govern the processing of the messages carrying the client service request and the return of the message carrying the response to the client server request from the web server. Protocol rules require that both the message carrying the client service request and the message carrying the response from the web server be a syntactically correct byte chain. A sample client service request message consists of a resource name, i.e., URL, file name, message number. Prior to sending the resource name, the client may exchange additional messages with the web server, but all of the exchanged messages must conform to the protocol rules, e.g., for user authorization. All of the messages (including the client service request and the response to the client service request), generated between the client and the web server during the connection period, constitute a session. Additional details regarding the use of specified protocols may be found in reference (2) in the Bibliography.

Two web farm types may be distinguished: symmetric and asymmetric. A web farm in which all of the real servers are able to process an equal set of client service requests is typically called a symmetric web farm. A web farm in which each real server is specialized to service a specified class of requests is typically called an asymmetric web farm.

In a symmetric web farm, incoming traffic is distributed among replicated servers, thus permitting server clusters to share the processing load, to provide for over capacity situations, and to speed up the response time for users.

In a symmetric web farm, load balancing servers operate to route traffic to the best web server available to handle a client request. Load balancing policies implemented by the load balancing server are defined which reflect the capabilities of the real servers and direct client requests based on the capabilities of the web farm real servers.

For example, in an asymmetric web farm, an HTTP service implies that one asymmetric web farm real server processes html text page requests and another asymmetric web farm real server processes image requests.

In contrast, in a symmetric web farm, all real servers must be able to process both a page request and an image request. Further information regarding symmetric farms may be found in reference (11) in the Bibliography.

Functions of the load balancing server for a symmetric web farm and an asymmetric web farm differ. In a symmetric web farm, the load balancing server does not define the resource requested, as all of the real servers have an equal set of resources available. The load balancing server does not wait for the client service request to arrive. Rather, the load balancing server simply selects a random real server. Although relatively simple conceptually, the symmetric web farm is quite challenging to properly support. For an administrator to maintain identical contents in all of the real servers is a highly technical task. In addition, maintaining identical contents in all of the real servers requires extra long-term memory capacity.

For the real servers of an asymmetric web farm, it is not essential for all web servers to know how to answer each client service request. Rather, it is essential for the web farm, however, to be able to assure availability of the proper type of real server to process each client service request (for example, all *.gif type URLs are processed at one real server, and all *.html type URLs are processed at another real server). The load balancing server, thus, selects a real server which is capable of processing a particular client service request, and then forwards the client service request to the selected real server. Prior to receiving the client service request, the load balancing server is in continuous communication with the client according to the web server protocol. Upon receiving the client service request, the load balancing server forwards all client service request information to the real server, even if the protocol calls for an additional exchange of information. This means that the load balancing server stores all of the information from the initial session and then later forwards the information to the real server. Selection of the real server according to the type of resource requested is further detailed in references (9) and (10) in the Bibliography.

To exchange messages using a high-level protocol, lower level protocols are used. For the Internet, such lower level protocols are represented by TCP protocols that guarantee correct data delivery. The TCP protocol treats high-level protocol messages, such as client service requests and the responses from web servers, as data to be delivered. To deliver data from one web server to another, a TCP connection between the web servers is required. The data to be delivered from one web server to another by a TCP connection is split into data packets, with each data packet being sent separately. At the receiving end of the message, the data packets are appropriately assembled together, such that an addressee receives the data in succession as transmitted by the sender. Each data packet receives an additional header, called a TCP header. The TCP header bears the information necessary for successive assembly of the data packet. The TCP header also carries information on masked data distortions. The information on masked data distortions is referred to as the checksum and is acquired from the TCP header and the data packet contents. When there is data distortion, the checksum at the addressee will not match the checksum which is stated in the TCP header and validation of a properly transmitted message cannot occur. TCP header fields, or options, optimize the speed of data transmission. The set of TCP header fields is defined upon connection and depends on the type of TCP protocol used.

The TCP protocol also uses a lower level IP protocol. The scheme under which one higher level protocol uses another lower level protocol is referred to as a stack. For instance, TCP/IP and other (e.g., ICMP, ARP, etc.) protocols constitute a TCP stack. TCP stacks are further described in reference (5) in the Bibliography.

The attachment or implementation of a TCP stack on a message typically occurs in that part of the operating system resident in the kernel space of a computer resource. Applications capable of receiving messages with high-level protocols (e.g., HTTP, FTP, POP3) are typically resident within the user space and use the TCP stack functions by means of special system calls. Accordingly, the TCP connection as well as the reading and transmission of data is provided by the system calls. Service of a particular protocol located in user space is only able to access data. Within user space, operations such as splitting data into packets, calculation of checksums, and packet headers, remain inaccessible since they occur inside the TCP stack. More details about system calls may be found in reference (6) in the Bibliography.

The concept of the Linux Virtual Server (LVS), described in reference (7) in the Bibliography, represents the closest analogue to the Server Load Balancing System of the present invention. Specifically, the Linux Virtual Server and the disclosed Server Load Balancing System share the following features:

service is a part of the operating system resident in the kernel space; and     a client request is treated as a succession of data packets.

The major difference between the disclosed server load balancing system and the Linux Virtual Server is that the Linux Virtual Server is not able to work with an asymmetric web farm. The Linux Virtual Server provides no internal buffer until the request-processing server has been chosen. Thus, web servers connected to a Linux Virtual Server are unable to balance their loading by the contents of client requests. Additionally, the Linux Virtual Server does not use a TCP stack, but rather uses lower level functions to send and receive data packets.

A need remains in the art, therefore, for a system and method to maximize the load balancing service for real servers in an asymmetric web farm.

BRIEF SUMMARY OF THE INVENTION

The present invention relates to a system and method for maximizing the efficiency of load balancing service for real servers of an asymmetric web farm.

In an asymmetric web farm, each real server is specialized to service a specified class of client service requests. The load balancing server portion of the asymmetric web farm stores all of the information to be forwarded to the real server—which real server is selected at a later time. A set of predefined rules is applied by the load balancing server for selecting a real server to process the client service request according to the contents of the client service request, the client IP address, the load level of the web farm real servers, and the available memory of the web farm real servers.

The present invention utilizes a TCP stack to send and receive data packets. The TCP stack is implemented as part of the operating system resident in kernel space of the load balancing server and a client service request is treated as a succession of data packets. The disclosed load balancing system provides an internal buffer which enables each of the real servers in the asymmetric web farm to balance their loading by client service request contents. Being fully implemented inside the kernel portion of the load balancing server, the disclosed load balancing system eliminates the need for multiple content copying and switching operations within the operating system. The placement of the disclosed server load balancing system for an asymmetric web farm in kernel space of the load balancing server eliminates the need for multiple content copying and transfer operations between the user space and the kernel space.

The disclosed system for improving the performance of a load balancing server for real servers in an asymmetric web farm enables the receipt of a client request as a sequence of TCP packets. The TCP packets are then sent to a real server in the set of real servers in the asymmetric web farm. The response from the real server to the client request is then sent as a sequence of TCP packets back to the client. The implementation of this load balancing service is performed entirely within the kernel space of the load balancing server.

Further, the disclosed system for improving the performance of a load balancing server uses certain functions of a TCP stack and creating a TCP connection to the real server designated for client request processing, to include: receiving an incoming connection, setting up an outgoing connection, closing a connection, receiving incoming data packets, and sending outgoing data packets. According to the present invention, the load balancing service stores the data packets in an internal queue until the real server designated to process the client request has been chosen according to the contents of the data packet. The load balancing server then sends the data packets stored in the internal queue to the real server assigned to client request processing according to a predetermined algorithm and the functions of the TCP stack.

Load balancing is according to a set of preset rules describing: TCP checksum patent translating, contents of the client service request; IP address of a client determined by the titles of the data packets, loading level of the processor portions of the web servers assigned for client service request processing, and the size of the memory of the real servers assigned for client request processing.

As previously indicated, data which is delivered by TCP protocol is split into data packets. Each data packet bears a TCP header which contains the information necessary to reassemble the data and a checksum for detecting data distortion. The data packets are sent by means of a TCP checksum packet translating algorithm that allows formulation of a TCP packet data checksum through a checksum of a TCP packet header, thus conserving the use of computer resources.

BRIEF DESCRIPTION OF THE DRAWING FIGURES

A better understanding of the server load balancing system of the present invention may be had by reference to the drawing figures, wherein.

DETAILED DESCRIPTION OF THE INVENTION

Figure 1:
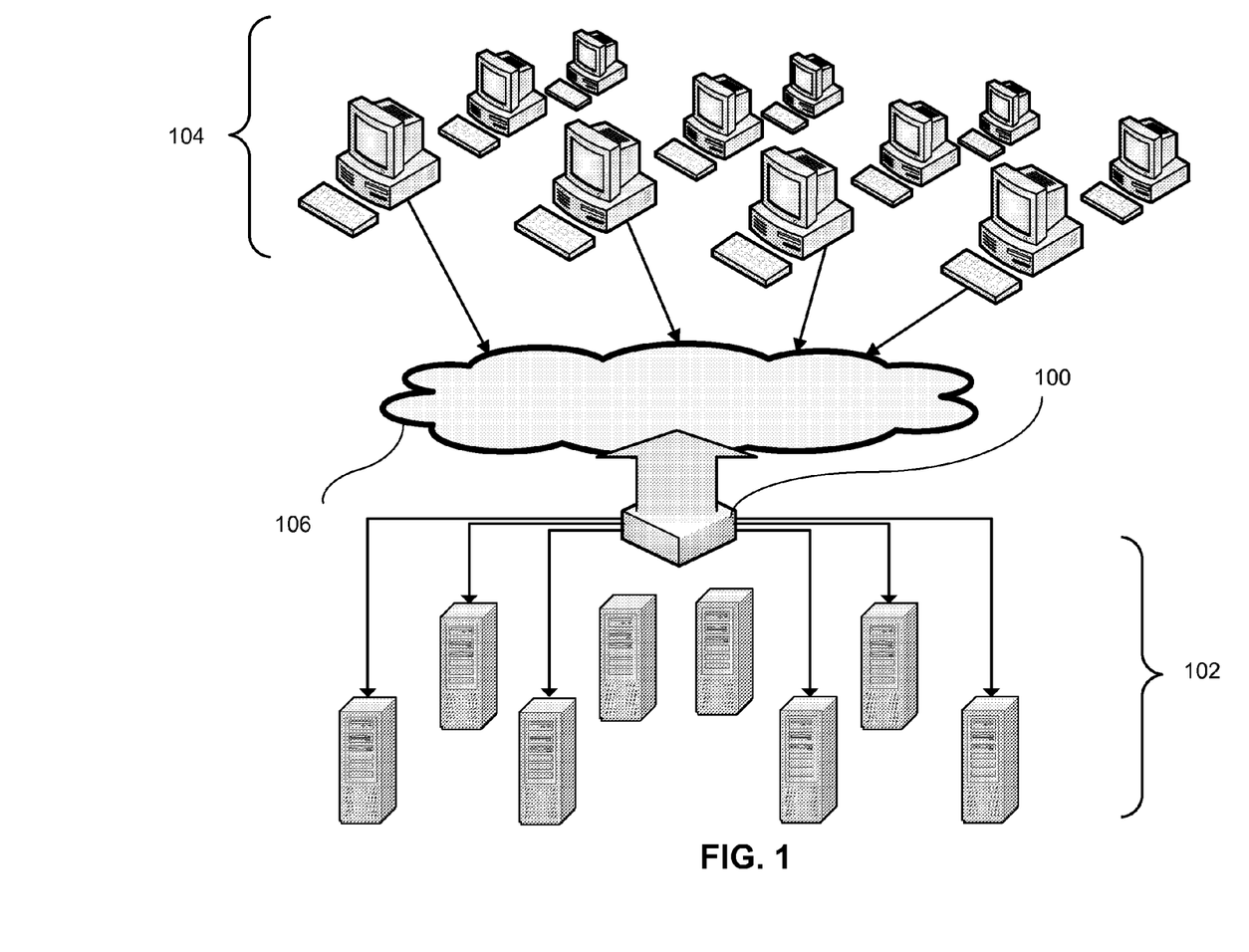
FIG. 1 is a schematic diagram of a prior art load balancing system.

Web site continually endeavor to provide scalable capacity for servicing client requests. Most large installations utilize some type of load balancing to achieve CPU capacity scaling. Load balancing can be done in several ways. One of the most commonly used methods is to use a server load balancing hardware device 100 as shown in FIG. 1. The server load balancing hardware device 100 is often a Layer 4 network switch. A layer 4 network switch acts as a front end for a web farm 102, which maximizes server resources by providing enhanced delivery of content between the web farm 102 and clients 104 connected to the web farm 102 through the Internet 106. Client requests are directed to the optimal web server in the web farm 102, based on web server loading, content distribution, and network conditions.

The present invention represents a system for load balancing of real servers in an asymmetric web farm. The disclosed server load balancing system may be used with high performance web servers and is implemented as part of the operating system resident in the kernel space of a load balancing server. Further, the disclosed system enhances the performance of the load balancing server due to the following:

Switching back and forth from that portion of the operating system in user space to that portion of the operating system in the kernel space of a load balancing server is not necessary to receive and send data. By the system of the present invention being fully implemented inside the kernel space of the load balancing server, the disclosed system eliminates the need for content switching between the user space and kernel space portions within the web server operating system.

Figure 2:
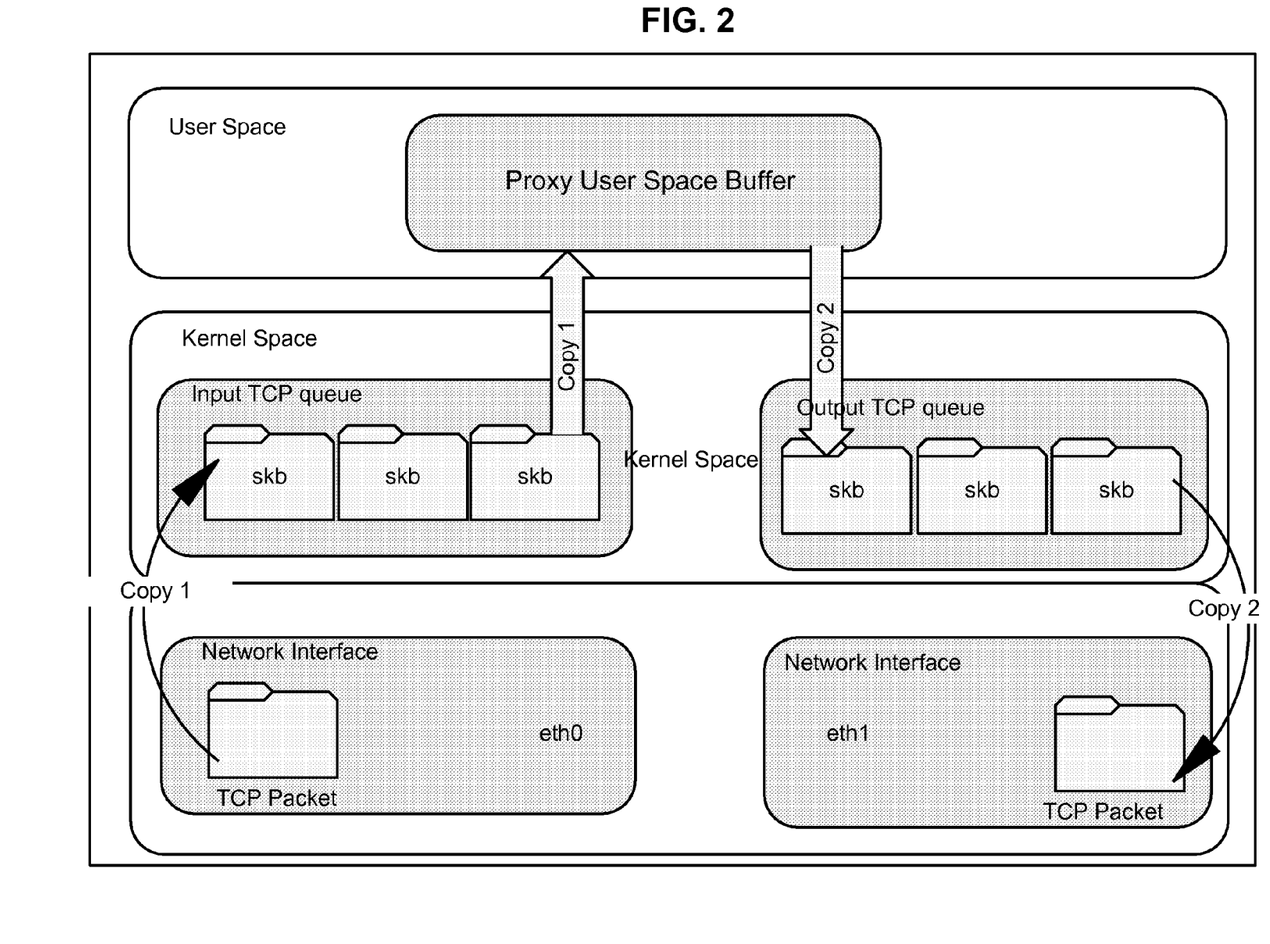
FIG. 2 is a schematic diagram illustrating the process of client service request processing requiring copying into user space.

Applications which run in the user space portion of the operating system cannot directly access data which is stored in the kernel space of the operating system. Therefore, any data sent or received must be copied from the user space to the kernel space. As shown in FIG. 2, the arrows marked "copy 2" and "copy 3" represent additional copies which must be made as the work request passes through a prior art load balancing server. These copies are in addition to copy 1 transferred between the network interface into kernel space eth0, and copy 4 between kernel space and the network interface eth1.

Figure 2A:
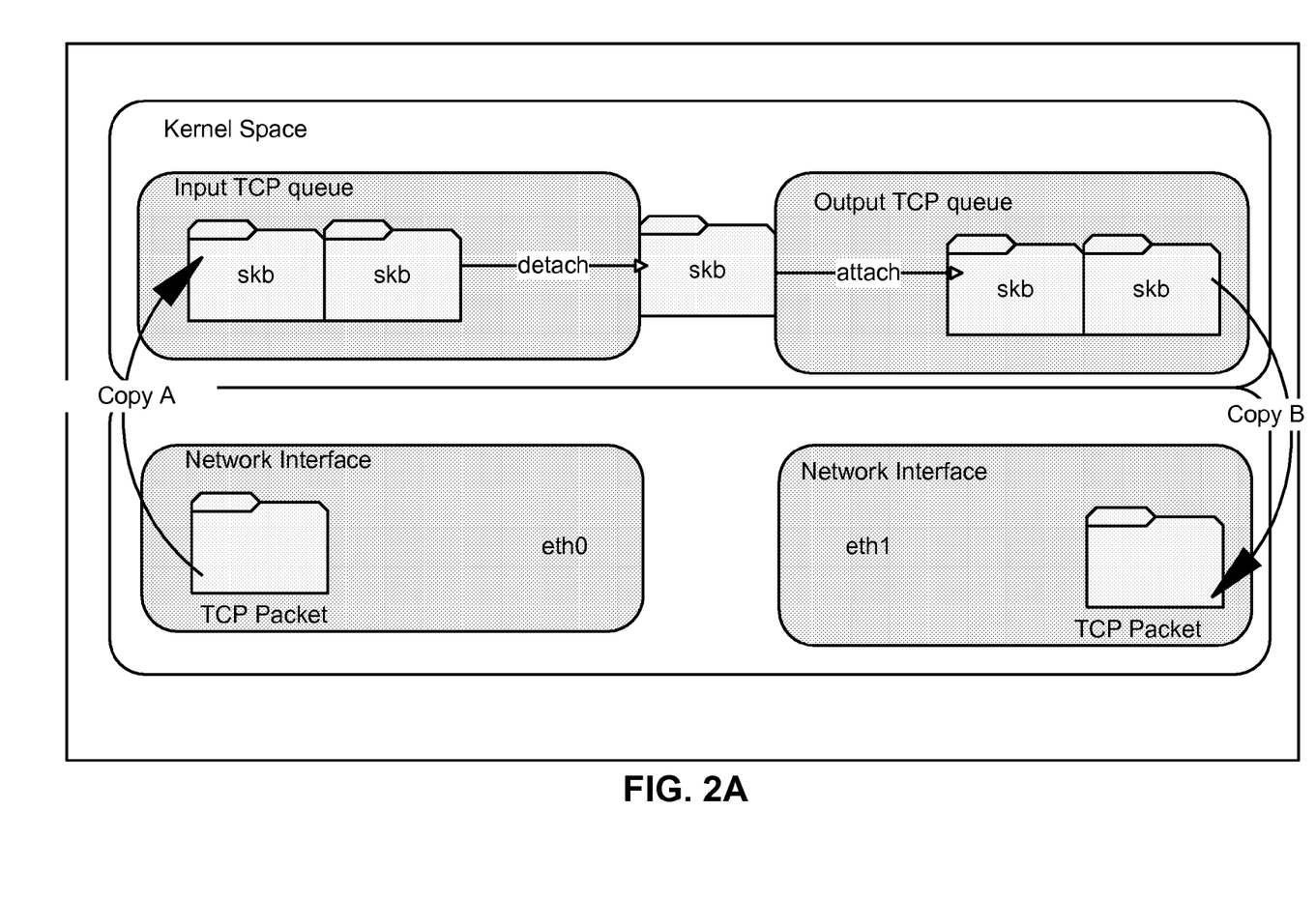
FIG. 2A is a schematic diagram illustrating the process of client service request processing entirely within kernel space.

As shown in FIG. 2A, in the present invention, the disclosed load balancing service is part of the operating system resident in kernel space of the web server, thus eliminating the need for data copying (copy 2 and copy 3 in FIG. 2) between the user space and the kernel space. Because the client service request never leaves the kernel space, only copies A and B are required.

Most data in response to client requests travels via the load balancing server as transit data, i.e. according to the present invention, the load balancing server moves data without processing it. Access to the TCP headers optimizes the data movement mechanism by the use of checksum packet information which is accessible only from within the kernel space.

Functions of the TCP stack, which operate on data at the packet level, are applied for receiving and sending data. This means that according to the disclosed system, the load balancing server does not address the network device directly for receiving and sending data packets, but rather uses the TCP stack functions. The TCP stack functions treat the flow of data as a sequence of data packets, not as a continuous flow of data, due to the following reasons:

Information received from the TCP packets optimizes the process of sending the packets. Functions of a buffer level, if applied, make information on the checksums and headrest inaccessible.

The disclosed server load balancing system receives and sends data as a sequence of TCP packets. No additional data buffer for copying the data sequence contents is used.

The TCP stack correctly selects options for the TCP data packet headers.

The TCP packets received from the client stay in an internal queue until the client service request has been accepted. The TCP packets are then used to send requests to the real server which allows the following:

client service request analysis, including splitting client service requests into data packets;

use of data packets for request sending to a real server to avoid additional creation and copying of packets and optimization of the checksum calculation.

Figure 3:
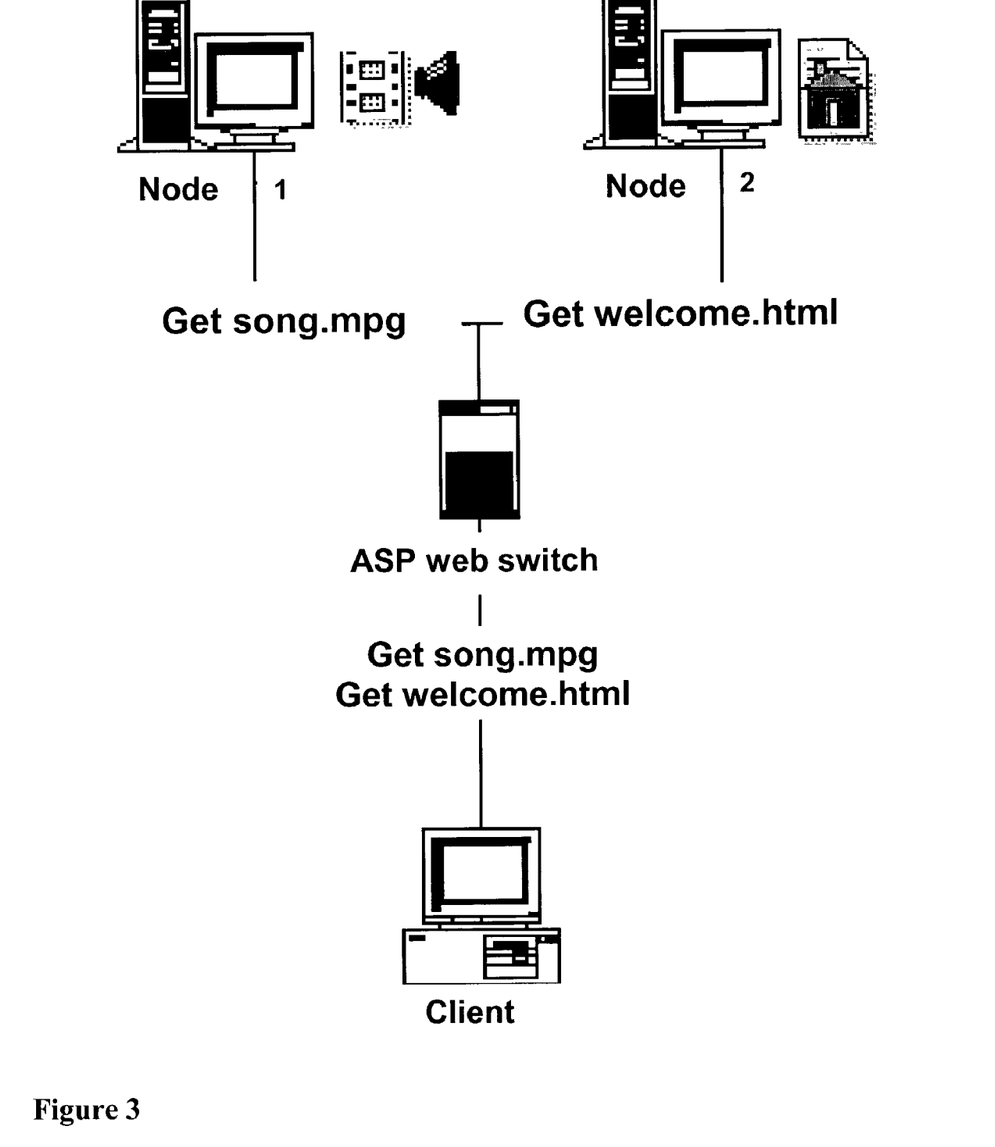
FIG. 3 is a schematic diagram illustrating the process of client service request balancing by client service request contents.

A set of predefined rules within the load balancing service is applied for selecting a real server to process the client service request. The rules operate with the following information:

Contents of a client service request which allows selection of a real server by the type of resource requested as shown in FIG. 3, wherein an asymmetric web farm is used. Note that all of the URL's of an mpg type go the real server at Node 1, and all of the URL's of an html type go to the real server at Node 2.

Figure 4:
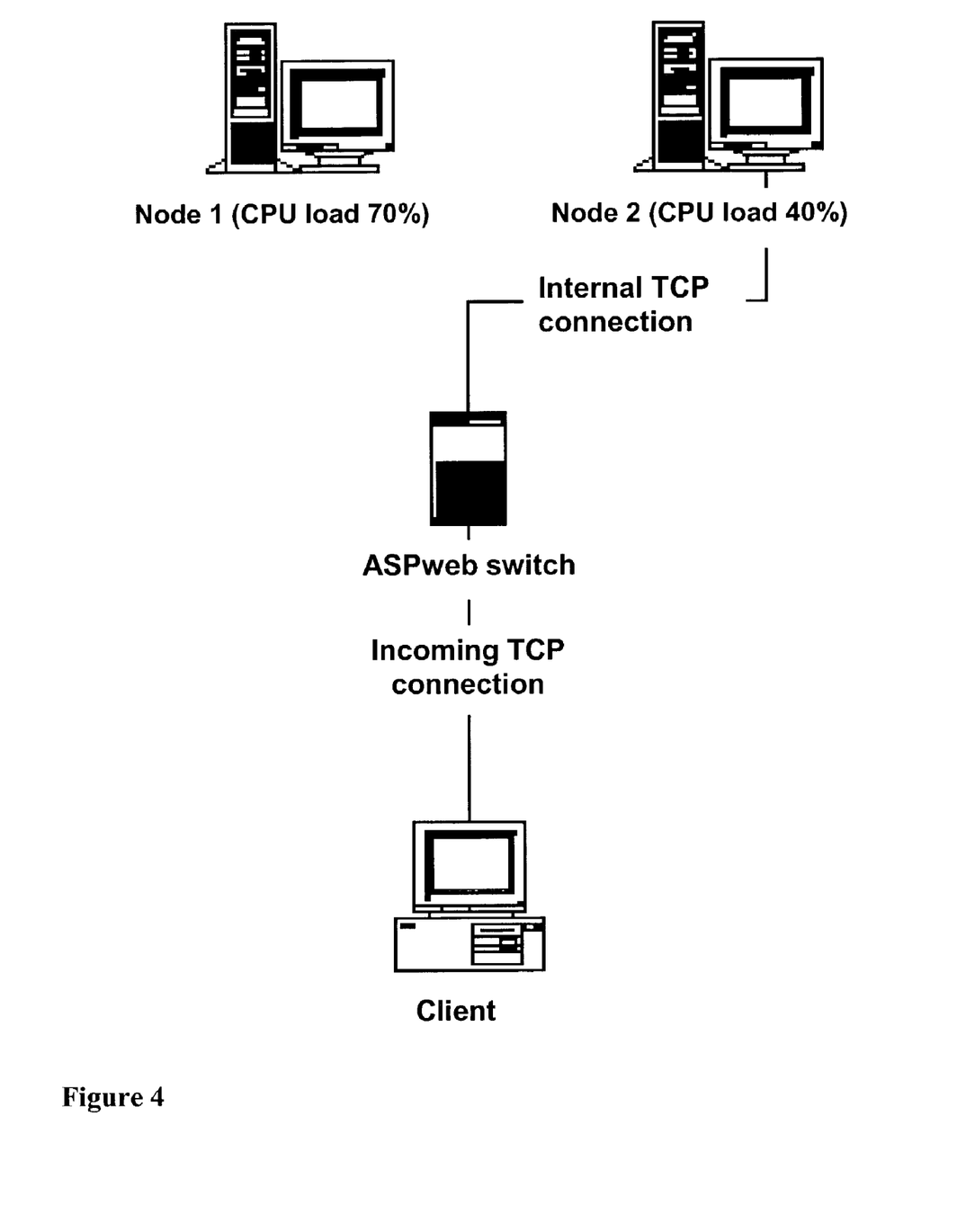
FIG. 4 is a schematic diagram illustrating the process of client service request balancing by the level of load of web farm server processors.

Client IP address, which permits the identification of a group of superusers that receive premium service, e.g., their request receives priority for a more powerful and less loaded real server;

Information on the loading level of the web farm real servers, to enable the load balancing service to select the least loaded real server and provide the fastest possible request processing as shown in FIG. 4. Note that the client request goes to the least loaded real server at that moment in time.

Information on the memory in use of the web farm real servers, to permit the load-balancing service to select the least loaded real server and provide the fastest possible client service request processing.

The data packets are sent by means of a TCP checksum packet translating algorithm that allows formulating a TCP packet data checksum through a checksum of a TCP packet header. The checksum of the TCP packet received by the disclosed load balancing service from either a real server or a client is calculated by the sender. To acquire the checksum of the outgoing packet, the checksum translating algorithm employs the checksum of the incoming packet. This is possible because of the checksum "linear" dependence of the buffer for which it is calculated. If the buffer is split into two parts, the checksum of the pre-split buffer is linearly calculated from the checksums of the two parts. Therefore, since only the title changes in an outgoing packet, calculation of the title checksum is sufficient to determine the outgoing packet checksum. The TCP checksum packet translating algorithm conserves computer resources, for example, if a regular TCP header is 60 bytes and the data area size is 1500 bytes, the computer resource consumption is decreased by a factor of 25.

According to the present invention, the disclosed load balancing service, being in a state where the connection from the client to a load balancing server and from the load balancing server to the real server assigned to respond to a client request for service are open, relocates the TCP data packets received by one of the connections to the other connection according to said TCP checksum translating algorithm and the functions of the TCP stack. The load balancing service closes down the other connection by the functions of the TCP stack when one of the connections from the client to the load balancing server to the real server assigned to process the client service request is closed.

BIBLIOGRAPHY

1. R. S. Engelschall "Load balancing your web site: Practical approaches for distributing http traffic," Web Techniques Magazine, 3(5), May 1998.
2. Network Working Group "Request for Comments: 2616 Hypertext Transfer Protocol—HTTP/1.1."
3. Network Working Group "Request for Comments: 765 File Transfer Protocol."
4. Network Working Group "Request for Comments: 1725 Post Office Protocol—Version 3."
5. Network Working Group "Request for Comments: 1180 A TCP/IP Tutorial."
6. "Operating System Concepts" by Abraham Silberschatz, Peter Galvin; John Wiley & Sons; ISBN: 0471364142.
7. Wensong Zhang "Linux Virtual Server for Scalable Network Services", Ottawa Linux Symposium 2000.
8. Operating Systems: a design-oriented approach/Charles Crowley, Irwin, 1997, ISBN 0-256-15151-2.
9. Brendel, et al. Jun. 30, 1998 U.S. Pat. No. 5,774,660.
10. Brendel Jan. 30, 2001 U.S. Pat. No. 6,182,139.
11. Rege Mar. 18, 1997 U.S. Pat. No. 5,612,897.
12. Allon, et al. Jul. 23, 1996 U.S. Pat. No. 5,539,883.

While the present invention is disclosed according to its preferred embodiment, those of ordinary skill in the art will understand that other embodiments have been enabled by the foregoing disclosure. Such other embodiments shall be included within the scope and meaning of the appended claims.

What is claimed is:

1. A load balancing server for balancing real servers in an asymmetric web farm, the load balancing server comprising:

a processor;

memory;

computer code loaded into the memory for performing functions of the load balancing server;

wherein the load balancing server:

receives a client request as a sequence of client TCP packets;

translates the sequence of client TCP packets to a server in a set of the real servers in the asymmetric web farm; and     translates a response of the real server as a sequence of server TCP packets back to the client,     wherein a service for the balancing and translating of the client TCP packets and the real server TCP packets is installed and running within a kernel space of the load balancing server,     wherein a real server from the set of real servers that processes the client request is chosen based on contents of the client TCP packets and based on network conditions,     wherein the load balancing server calculates a checksum for a header of the client TCP packet;

calculates a checksum for a header of the translated TCP packet having a new destination address;

generates a new checksum for the translated TCP packet, the translated TCP packet including a header and payload, the new checksum being generated by linear operations on the checksum for the client TCP packet, the checksum for the header of the client TCP packet and a checksum for the header of the translated TCP packet;

wherein the validity of the TCP packet, before and after translation, is preserved without additional verification; and wherein each of the real servers services a specific class of the client requests based on file type of the client requests.

2. The load balancing server of claim 1, wherein said load balancing server uses functions of a TCP stack, including:

receiving an incoming connection, setting up an outgoing connection, closing a connection, receiving incoming data packets, and sending outgoing data packets.

3. The load balancing server of claim 2, wherein the load balancing server uses the function of the TCP stack to receive a client connection.

4. The load balancing server of claim 3, wherein the load balancing server receives all the incoming data packets of the client connection by using the functions of the TCP stack.

5. The load balancing server of claim 4, wherein the load balancing server continues storing the incoming data packets of the client connection in an internal queue until the real server designated to process the client request has been chosen based on contents of the incoming data packets.

6. The load balancing server of claim 5, wherein the load balancing server determines the real server to respond to the client request according to preset operating rules.

7. The load balancing server of claim 6, wherein the preset operating rules include:

contents of the client service request of the internal queue;

an IP address of a client determined by titles of packets of the internal queue;

loading level of processors of web servers assigned for client service request processing; and size of memory of the real servers assigned for client request processing.

8. The load balancing server of claim 1, wherein the load balancing server creates a TCP connection to the real server assigned for client service request processing by using functions of a TCP stack, the functions comprising:

receiving an incoming connection, setting up an outgoing connection, closing a connection, receiving incoming data packets, and sending outgoing data packets.

9. The load balancing server of claim 1, wherein said load balancing server operates a TCP checksum packet translating algorithm for packet dispatching, wherein said TCP checksum packet translating algorithm formulates a TCP packet data checksum through a checksum of a TCP packet header.

10. The load balancing server of claim 9, wherein, to provide consistency, the load balancing server updates TCP headers of data packets and sends the data packets stored in an internal queue to the real server assigned for client request processing using the TCP checksum packet translating algorithm and functions of a TCP stack.

11. The load balancing server of claim 10, wherein the load balancing server terminates other connections to the real servers by invoking functions of the TCP stack when the connections between the client and the load balancing server and between the load balancing server and the real server chosen to respond to the client requests are closed.

12. The load balancing server of claim 9, wherein, to provide consistency, the load balancing server, when the connections from the client to the load balancing server and from the load balancing server to the real server assigned for client service request processing are open, updates TCP headers of data packets and relocates the TCP data packets received by one of the connections to the other outgoing connection using the TCP checksum translating algorithm and functions of a TCP stack.

13. The load balancing server of claim 1, wherein the load balancing server, upon receiving the client sequence, places the client sequence in a memory buffer.

14. The load balancing server of claim 13, wherein the load balancing server, upon placing the sequence in the memory buffer, parses the client TCP packets to analyze client requests, the parsing being installed and running in kernel space.

15. The load balancing server of claim 13, wherein the load balancing server, upon parsing the client TCP packets, modifies headers of the client TCP packets to ensure consistency of the client TCP packets.

16. The load balancing server of claim 1, wherein superusers that receive priority service from the real servers are identified based on their IP address.

17. A computer storage medium having computer executable program logic stored thereon, the computer executable program logic executing on a processor for balancing load of real servers in a web farm, the computer program logic comprising:

(a) computer program code means for receiving a client request as a sequence of client TCP packets;

(b) computer program code means for translating the sequence of the client TCP packets to a server in a set of the real servers in the web farm; and (c) computer program code means for translating a response of the real server as a sequence of the real server TCP packets back to the client, wherein a real server from the set of real servers that processes the client request is chosen based on contents of the client TCP packets and based on network conditions, wherein the load balancing server calculates a checksum for a header of the client TCP packet;

calculates a checksum for a header of the translated TCP packet having a new destination address;

generates a new checksum for the translated TCP packet, the translated TCP packet including a header and payload, the new checksum being generated by linear operations on the checksum for the client TCP packet, the checksum for the header of the client TCP packet and a checksum for the header of the translated TCP packet;

wherein the validity of the TCP packet, before and after translation, is preserved without additional verification; and wherein each of the real servers services a specific class of the client requests based on file type of the client requests.

18. The computer storage medium of claim 17, wherein the web farm is an asymmetric web farm, and wherein the computer program code means (a), (b) and (c) are installed and running within a kernel space of a load balancing server.

19. A method for balancing load of real servers in an asymmetric web farm, comprising:

receiving a client request as a sequence of client TCP packets;

translating the sequence of client TCP packets to a server in a set of the real servers in the asymmetric web farm; and translating a response of the real server as a sequence of the real server TCP packets back to the client, wherein a service for balancing and translating of the client TCP packets and the real server TCP packets is installed and running within a kernel space of a load balancing server, wherein a real server from the set of real servers that processes the client request is chosen based on contents of the client TCP packets and based on network conditions;

calculating a checksum for a header of the client TCP packet;

calculating a checksum for a header of the translated TCP packet having a new destination address;

generating a new checksum for the translated TCP packet, the translated TCP packet including a header and payload, the new checksum being generated by linear operations on the checksum for the client TCP packet, the checksum for the header of the client TCP packet and a checksum for the header of the translated TCP packet;

wherein the validity of the TCP packet, before and after translation, is preserved without additional verification; and wherein each of the real servers services a specific class of the client requests based on file type of the client requests.

20. A load balancing server for balancing real servers in an asymmetric web farm, the load balancing server comprising:

a processor;

memory;

computer code loaded into the memory for performing functions of the load balancing server;

a load balancing module; and a TCP packet translating module that receives a client request as a sequence of client TCP packets, translates the sequence of the client TCP packets to a real server of the asymmetric web farm, and translates a response of the real server as a sequence of the real server TCP packets back to the client, wherein a real server is chosen from a set of real servers of the asymmetric web farm based on network conditions, wherein the load balancing server calculates a checksum for a header of the client TCP packet;

calculates a checksum for a header of the translated TCP packet having a new destination address;

generates a new checksum for the translated TCP packet, the translated TCP packet including a header and payload, the new checksum being generated by linear operations on the checksum for the client TCP packet, the checksum for the header of the client TCP packet and a checksum for the header of the translated TCP packet;

wherein the validity of the TCP packet, before and after translation, is preserved without additional verification.

21. The load balancing server of claim 20, wherein:

the load balancing module is installed and running within a kernel space of an operating system of the load balancing server; and wherein the TCP packet translating module is installed and running within a kernel space of the load balancing server, wherein the real server is chosen from the set of real servers based on file type of the client requests.

22. A load balancing server for balancing real servers in an asymmetric web farm, wherein the load balancing server comprises:

a processor;

memory;

computer code loaded into the memory for performing functions of the load balancing server;

wherein the load balancing server:

receives a client response as a sequence of client TCP packets;

translates the sequence of client TCP packets to a server in a set of the real servers in the asymmetric web farm; and translates a response of the real server as a sequence of server TCP packets back to the client, wherein a service for the balancing and translating of the client TCP packets and the real server TCP packets is installed and running within a kernel space of the load balancing server, and wherein some clients are assigned higher priority for responding to their client requests based on client IP addresses, wherein servers that respond to the client requests are chosen based on network conditions, and wherein the load balancing server calculates a checksum for a header of the client TCP packet;

calculates a checksum for a header of the translated TCP packet having a new destination address;

generates a new checksum for the translated TCP packet, the translated TCP packet including a header and payload, the new checksum being generated by linear operations on the checksum for the client TCP packet, the checksum for the headed of the client TCP packet and a checksum for the header of the translated TCP packet;

wherein the validity of the TCP packet, before and after translation, is preserved without additional verification.

23. A load balancing server for balancing real servers in a farm of server applications, wherein the load balancing server comprises:

a processor;

memory;

computer code loaded into the memory for performing functions of the load balancing server, wherein the load balancing server:

receives a client request as a sequence of client TCP packets;

translates the sequence of client TCP packets to the real server applications in the farm; and translates a response of the real server applications as a sequence of TCP packets back to the client, wherien the load balancing server calculates a checksum for a header of the client TCP packet;

calculates a checksum for a header of the translated TCP packet having a new destination address;

generates a new checksum for the translated TCP packet, the translated TCP packet including a header and payload, the new checksum being generated by linear operations on the checksum for the client TCP packet, the checksum for the header of the client TCP packet and a checksum for the header of the translated TCP packet;

wherein the validity of the TCP packet, before and after translation, is preserved without additional verification;

wherein a real server application from the set of real server applications that processes the client request is chosen based on requested service in message contents of the client request, wherein each of the real server applications services a specific class of the client requests that is selected based on the message contents, and generates responses to the incoming client requests.

24. The load balancing server of claim 23, wherein:

the farm is an asymmetric farm, wherien each of the real server applications services a specific class of the client requests that is selected based and based on network conditions, and wherein superusers that receive priority service from the real servers are identified based in their IP address.

* * * * *